United States Patent [19]

Porter

[11] 4,423,922

[45] Jan. 3, 1984

[54] DIRECTIONAL COUPLER FOR OPTICAL COMMUNICATIONS SYSTEM

[75] Inventor: David R. Porter, Seattle, Wash.

[73] Assignee: The Boeing Company, Seattle, Wash.

[21] Appl. No.: 970,730

[22] Filed: Dec. 18, 1978

[51] Int. Cl.³ .............................................. G02B 5/14
[52] U.S. Cl. .............................. 350/96.15; 350/96.20; 370/4
[58] Field of Search .................. 250/199; 350/96.15, 350/96.16, 96.17, 96.20, 96.21; 370/1, 4

[56] References Cited

U.S. PATENT DOCUMENTS

| | | | |
|---|---|---|---|
| 3,504,182 | 3/1970 | Pizzurro et al. | 250/199 |
| 3,870,396 | 3/1975 | Racki et al. | 350/96.16 |
| 3,883,217 | 5/1975 | Love et al. | 350/96.16 |
| 3,883,222 | 5/1975 | Gunderson | 350/96.16 |
| 3,936,141 | 2/1976 | Milton | 350/96.16 |
| 3,937,560 | 2/1976 | Milton | 350/96.16 |
| 3,977,764 | 8/1976 | d'Auria et al. | 350/96.16 |
| 4,021,099 | 5/1977 | Kawasaki et al. | 350/96.21 |
| 4,092,061 | 5/1978 | Stigliani, Jr. | 350/96.15 |
| 4,149,770 | 4/1979 | Milton et al. | 350/96.15 |
| 4,165,914 | 8/1979 | Villarruel et al. | 350/96.16 |
| 4,169,656 | 10/1979 | Hodge | 350/96.15 |

FOREIGN PATENT DOCUMENTS 2721347  11/1978  Fed. Rep. of Germany ... 350/96.20

OTHER PUBLICATIONS

Cooper, "Coupler for Optical Data", *IBM Tech. Discl. Bulletin*, vol. 16, No. 5, Oct. 1973, pp. 1470–1471.
"Simple Coupler Taps Fiber-Optic Cables", *Electronics*, Dec. 20, 1973, pp. 30–31.

*Primary Examiner*—John D. Lee
*Attorney, Agent, or Firm*—Lynn H. Hess; B. A. Donahue

[57] ABSTRACT

A directional coupler for an optical communications system of the type utilizing non-collimated optical beams transmitted by waveguides. The coupler includes an input waveguide, a network waveguide, and a detector port, and has a beam-directing surface positioned between the input waveguide and the network waveguide. The beam-directing surface defines an opening aligned with and adjacent to the input waveguide, and a beam conducting medium fills the space between the two waveguides. Input optical beams are transmitted from the input waveguide through the opening to the network waveguide, and output optical beams are transmitted from the network waveguide to the beam-directing surface. The core area of the network waveguide is large relative to the opening, and the output optical beam expands as it travels through the conducting medium to the directing surface. The portion of the output beam not entering the opening is directed to the detector port, and the area of this portion is large relative to the area of the opening so that power loss is minimal.

19 Claims, 7 Drawing Figures

DIRECTIONAL COUPLER FOR OPTICAL COMMUNICATIONS SYSTEM

BACKGROUND OF THE INVENTION

This invention relates to directional couplers for optical communications systems.

Communications systems utilizing optical beams, i.e., wave with a frequency in the optical range, to carry signals have been employed successfully in a wide variety of environments. One category of optical communications system, known as a time division multiplex (TDM) system, has a plurality of terminals each including both a send and a receive station for sending and receiving signals through a common trunk line or network on a time sharing basis.

Some TDM systems utilize a network comprising separate or dedicated optical conductors for connecting the various terminals to one another, while other TDM systems utilize a network in the form of a single optical conductor. In the latter case the terminals are connected to the network by a plurality of directional couplers each associated with a different individual terminal. Examples of such systems which utilize directional couplers are found in the U.S. Pat. Nos. 3,883,217 to Love, et al.; 3,883,222 to Gunderson; and 3,936,141 to Milton.

Optical communications systems which are utilized, for example, in an aircraft generally employ non-collimated optical beams delivered through suitable multimode waveguides for carrying signals; and one characteristic of such beams is that they diverge when not confined within the core area of a waveguide. Furthermore, these non-collimated beams are generated by a source such that the cross-sectional area of the beam at the source is small relative to the effective sensing area of the detectors being used in the system.

When utilized in an optical communications system, each directional coupler must efficiently couple output optical beams carrying signals from the network conductor to a detector at its associated terminal and efficiently couple input optical beams from a source at the send station of its associated terminal to the network conductor. Optical power loss in the directional coupler must therefore be minimized in both directions. In addition, direct coupling of an input beam from a source at the send station to the detector at the same terminal must be substantially eliminated since even a small portion of the optical power provided at the source could be sufficient to temporarily saturate the receiver amplifier connected to the detector and thereby interfere with the amplifier's response to a subsequent output beam.

Although the U.S. Pat. No. 3,504,182 to Pizzurro, et al. discloses a directional coupler which provides some of the aforesaid advantages in a free-space transmission system utilizing collimated optical beams, the coupler there disclosed would not be suitable for use in a communications system using non-collimated optical beams. The coupler disclosed in the Pizzurro, et al. patent would also be unsuitable, for example, where large numbers of waveguides are required to interconnect numerous terminals within a relatively confined space or where network conductors are run with other lines along a closely confined or tortuous path.

SUMMARY OF THE INVENTION

It is therefore an object of the present invention to provide a directional coupler which is suitable for use in an optical communications system utilizing a plurality of waveguides to transmit non-collimated beams; and, more specifically, to provide such a directional coupler which is easily manufactured and compact, provides efficient coupling of optical beams in both directions between a terminal and a network with a minimum of optical power loss, and substantially eliminates direct coupling of optical beams from a source to a detector at the same terminal.

In accordance with the invention, a coupler is provided which comprises a source port, a network port, a detector port, a directing means for receiving an output optical beam from the network port, and a beam conducting medium effective between the network port and the directing means for providing an expanded output optical beam to the directing means. The directing means is positioned in an optical path between the source port and the network port and defines a passageway for an input optical beam transmitted from the source port to the network port. The directing means directs the output optical beam received from the network port, except that portion thereof which enters the passageway, to the detector port; and, due to expansion of the output optical beam in the conducting medium and/or the large core area of the network port relative to the area of the passageway, the cross-sectional area of the output beam received by the directing means is large relative to the area of the passageway. In this way the present invention utilizes the divergence of a non-collimated optical beam, a property normally considered undesirable for communications systems from an efficiency standpoint, to improve the efficiency of an optical coupler.

The novel features which are characteristic of the present invention, and other objects, features, and advantages thereof, will be better understood from the following detailed description and the accompanying drawings which together disclose preferred embodiments of the invention.

DESCRIPTION OF THE PREFERRED EMBODIMENTS

Figure 1:
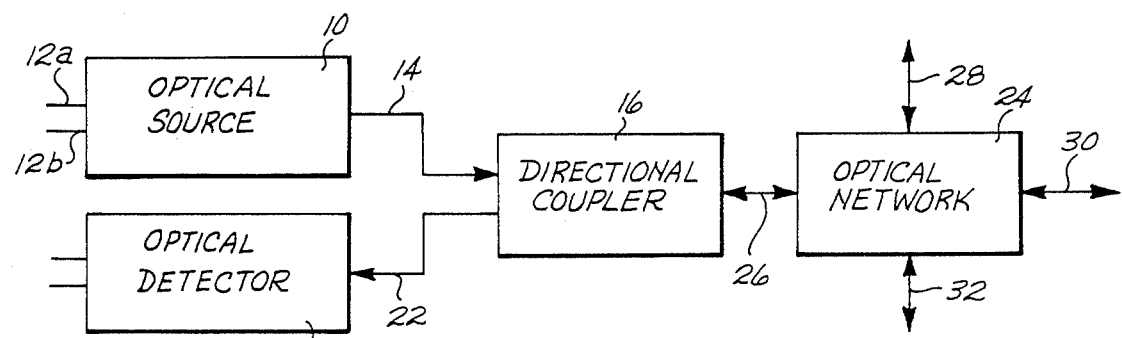
FIG. 1 is a block diagram of a portion of a time division multiplex optical communications system.

A portion of an optical communications system is shown in block diagram form in FIG. 1. As shown, an optical source 10 which may be, for example, a light emitting diode (LED), an infrared emitting diode, or a semiconductor injection laser diode is controlled by electrical leads 12a and 12b and is connected by a first waveguide 14 to a directional coupler 16. An optical detector 18 is also connected to directional coupler 16, and the detector is responsive to optical output signals for generating an electrical signal at its leads 20a and 20b. The optical detector 18 is optically coupled to directional coupler 16 by an optical conductor 22 which may be a waveguide or any other suitable optical transmission medium.

The directional coupler 16, the optical source 10, and the optical detector 18 together comprise a terminal which is connected to an optical conductor trunk or network 24 by a second waveguide 26. A plurality of additional waveguides 28, 30 and 32 connect other terminals (not shown) to optical network 24, and the network thus interconnects each of the terminals with the others. The leads 12a and 12b are connected to a send station of the terminal, and an electrical signal at these leads results in the generation, by the source 10, of an input optical beam which is transmitted through the directional coupler to the network 24 and, by the network, on to the other terminals of the system. Similarly, an output optical beam received by the network from any one of the other terminals is transmitted to each of the other stations, and such an output optical beam is received by the terminal shown in FIG. 1 through waveguide 26 and transmitted through coupler 16 to detector 18. This output optical beam received by detector 18 causes an electrical signal to be generated at leads 20a and 20b, and the electrical signal is delivered to a receive station connected to the leads. The input optical beams and output optical beams carry optical signals which represent information passing between send and receive stations of the terminals of the system. Ideally there will be no direct coupling of an input optical beam between a source and a detector on the same terminal.

In the optical communications system shown in FIG. 1 and described hereinabove, a single coupler handles both input and output beams for its associated terminal, and system efficiency depends on the efficiency with which the couplers couple power in both directions. It is therefore essential not only that input and output beams be properly directed to network and detector ports respectively of the coupler, but also that beam power loss in the coupler be minimized for coupling in either direction.

Figure 2:
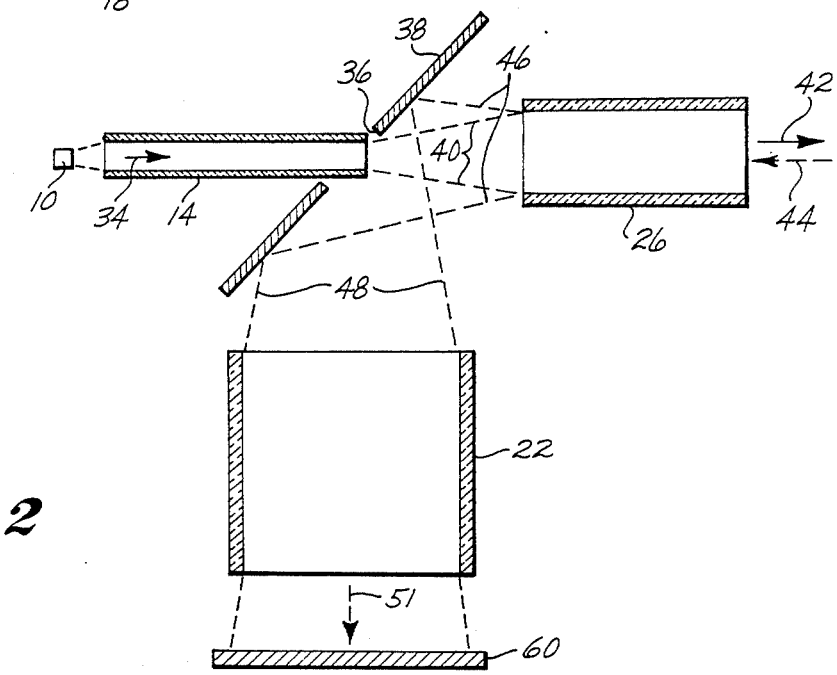
FIG. 2 is a sectional view in schematic form of a coupler in accordance with the invention.

Referring now to FIG. 2, a coupler in accordance with the invention is shown in schematic form. The coupler includes a source port in the form of a first waveguide, a network port in the form of second waveguide 26, and a detector port in the form of waveguide 22. Source 10 provides an input optical beam which travels through waveguide 14 in the direction of the arrow 34, and this input optical beam passes through an opening 36 in a beam directing means 38. The input optical beam diverges as it travels from waveguide 14 to waveguide 26, but the entire beam remains within a truncated cone indicated by dashed lines 40 between the inside ends of the waveguides. Since, as shown in FIG. 2, the entire input beam passes through opening 36 and the core area of waveguide 26 is larger than the core area of waveguide 14, substantially the entire input beam enters waveguide 26.

The waveguide 26 transmits input beams in the direction of arrow 42 and transmits output optical beams in the direction of arrow 44. Input optical beams are transmitted along waveguide 26 to the optical network, while output optical beams exit waveguide 26 at its inside end and are transmitted to beam directing means 38. As the output beam travels between waveguide 26 and directing means 38 it diverges, but the beam remains within the truncated cone indicated by the broken lines 46 between the plane of directing means 38 and the inside end of waveguide 26. The beam directing means includes a reflecting surface which directs the output beam towards waveguide 22; and, even though the directed output beam continues to diverge as indicated by broken lines 48 as it travels away from the reflecting surface, the waveguide 22 has a core area large enough such that substantially all of the directed beam enters the waveguide. The directed beam moves through the waveguide 22 in the direction of the arrow 51 until it is received by a detector 60.

Most of the output optical beam from waveguide 26 impinges against the reflecting surface of beam directing means 38, but a small portion passes through opening 36. That portion of the output beam which passes through opening 36 constitutes a power loss in the coupler but does not in other respects interfere with coupler performance. The degree of the power loss depends on the ratio of the area of opening 36 to the total area of the output in the plane defined at the reflecting surface, and this ratio will be relatively low in the coupler shown in FIG. 2.

In FIG. 2 the reflecting surface is positioned at 45 degrees to the axes of waveguides 26 and 22; and, although this arrangement is considered to be most advantageous, other angles could also be utilized. The spacing of the inside ends of waveguides 26 and 22 from the reflecting surface also affect the efficiency of the coupler since the output beam will, as has already been indicated, diverge as it travels through the coupler. The greater the spacing between waveguide 26 and the reflecting surface the greater will be the area of the reflected beam relative to the area of opening 36, and this will make a positive contribution to coupler efficiency. Furthermore, if the inside end of waveguide 26 is not adequately spaced from the reflecting surface there will be a danger that some of the reflected beam will be caught by waveguide 26 rather than continuing on towards waveguide 22.

Of course the spacing between the waveguides will always be limited by practical consideration. For example, the greater the spacing between waveguide 26 and the reflecting surface the larger the core area of waveguide 26 must be in order to efficiently receive the input beam from waveguide 14, and the larger the area of the reflecting surface must be. Similarly, the core area of waveguide 22 must always be larger than the area of the reflected beam at the reflecting surface in order for the waveguide to efficiently receive the beam, and as the distance between the reflecting surface and waveguide 22 increases the core area of the waveguide must also increase proportionately.

The shapes of the waveguides and the opening 36 will also have some effect on the efficiency of a coupler in accordance with the invention inasmuch as the areas of the optical beams will be affected thereby. The cross-sectional shapes of the waveguides and the opening shown in FIG. 2 are circular, but the invention is not limited to the use of any particular shape.

Figure 3:
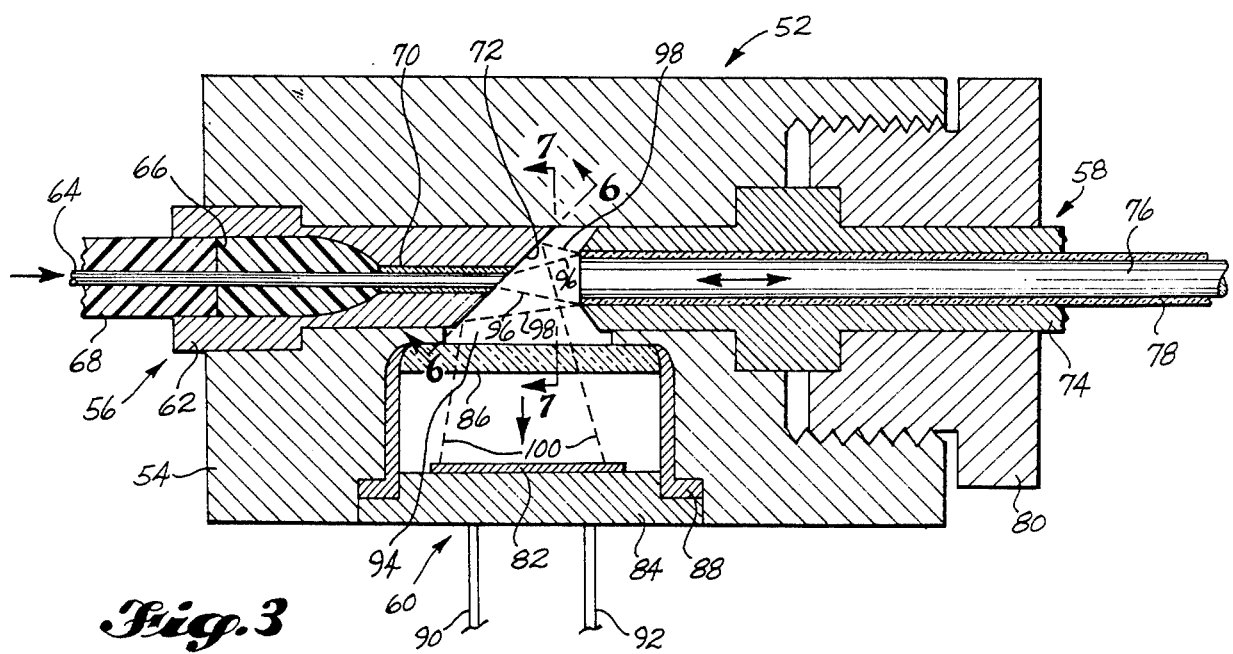
FIG. 3 is a sectional view of one embodiment of a directional coupler in accordance with the invention.

Referring now to FIG. 3, a coupler 52 in accordance with the invention is shown in cross-section. The coupler includes a housing 54 which positions and retains a first waveguide 56, a second waveguide 58, and a detector 60. The first waveguide includes a ferrule 62 rigidly mounted to the housing, and a cladded optical fiber 64 is retained in the ferrule by a suitable epoxy 66. The optical fiber extending from the outside end of the ferrule is protected by a fiber jacket 68, and at the inside end of the ferrule the space between the ferrule and the fiber is filled with a low-melting-point metal 70 such as an ordinary resin core solder. The inside ends of the fiber, the low-melting-point metal, and the ferrule define a plane surface 72 at 45 degrees to the axis of the fiber, and the surface 72, except for the portion taken up by fiber 64, is a polished surface which reflects optical beams.

The second waveguide 58 includes a ferrule 74 which encompasses an optical fiber 76 encased by a cladding material 78. The ferrule 74 is held in place relative to the housing 54 by a nut 80. The detector 60 includes a photo sensor element 82 attached to a base 84, a window 86, a casing 88 for supporting the window on the base 84, and the pair of electrical leads 90 and 92; and the detector 60 may be permanently attached to the housing 54 as shown by a suitable adhesive. The space 94 enclosed by the ends of the waveguides 56 and 58, the window 86, and interior surfaces of the housing 54 is filled with an index-matching optically conductive material which may be epoxy so that, in addition to its optical properties, the conductive material will help to hold the relative positions of the waveguides and the detector in the housing 54. Thus, a properly selected index-matching epoxy will help to minimize loss and unwanted (Fresnel) reflections, help define desired optical paths for the beams, and provide permanent location and retention for the coupler components.

In operation the coupler 52 acts as a directional coupler in that it couples input optical beams from fiber 64 to fiber 76 and also couples output optical beams from fiber 76 to photo sensor element 82. An input optical beam is transmitted along fiber 64 until it exits waveguide 56 at its inside end. The input beam is then transmitted through the index-matching epoxy in space 94 to fiber 76 which transmits the beam along the system network and ultimately to other terminals of the system. As the input beam passes through the epoxy-filled space 94 it diverges as indicated by broken lines 96, but the spacing between the inside ends of fibers 64 and 76 and their relative diameters are such that substantially the entire input beam enters fiber 76.

An output optical signal, on the other hand, is transmitted along fiber 76 until it exits waveguide 58 at its inside end. The output beam is then transmitted through the epoxy-filled space 94 to the surface 72 and in the process diverges to a larger cross-sectional area as indicated by the broken lines 98. That portion of the output beam incident against fiber 64 constitutes a power loss in the coupler, but that portion of the output beam incident against the remainder of surface 72 is reflected through the epoxy-filled space 94 and window 86 to element 82 causing an electrical signal to be generated in leads 90 and 92. Although the reflected portion of the output beam also diverges as indicated by the broken lines 100, the size of element 82 is such that substantially all of the reflected output beam is received thereby.

Figure 6:
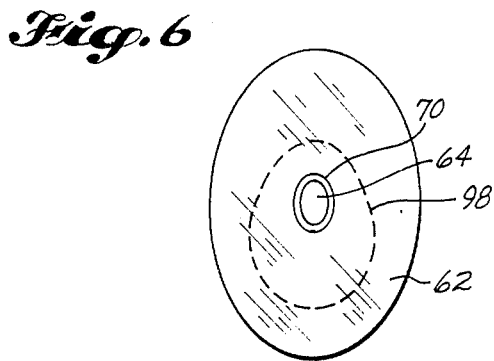
FIG. 6 is a view taken along line 6—6 in FIG. 3.
Figure 7:
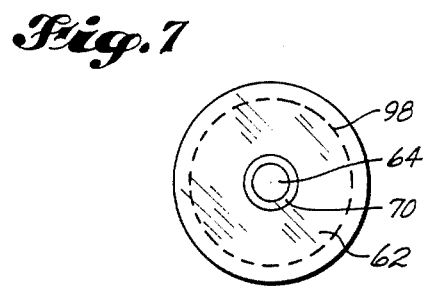
FIG. 7 is a view taken along line 7—7 in FIG. 3.

Thus there is, in the coupler just described, substantially no coupler power loss to input optical beams, and coupler power loss to output optical beams is limited to the proportion of fiber area on surface 72. For the coupler shown in FIG. 3, a good approximation of coupler power loss to the output optical beam is obtained by taking the ratio of the fiber area portion to the total area of surface 72 contacted by the optical output beam (see FIG. 6). An even better approximation of this coupler power loss will be obtained by taking the ratio of these areas projected onto a plane perpendicular to the core axis of waveguide 58 (see FIG. 7), but even this ratio will not precisely represent the percentage of coupler power loss since the intensity of the output optical beam will not be totally uniform throughout its expanded cross-section. Both approximations should, however, be sufficiently accurate for design purposes.

Figure 4:
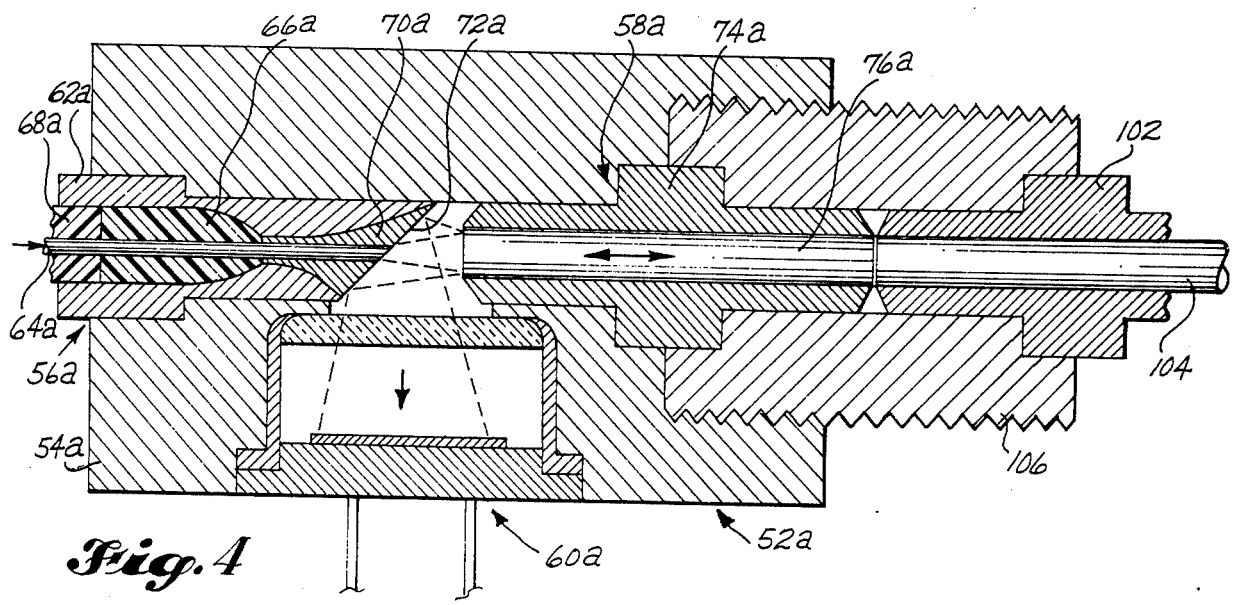
FIG. 4 is a sectional view of a modified form of the directional coupler of the present invention.

FIG. 4 shows, in cross-section, a coupler similar to the one shown in FIG. 3 and described hereinabove, but including certain modifications. The directional coupler 52a of FIG. 4 includes a housing 54a for enclosing a first waveguide 56a, a second waveguide 58a, and a detector 60a; and the detector 60a may be identical to the detector 60 shown in FIG. 3. Waveguide 56a includes a ferrule 62a rigidly mounted to housing 54a, and a cladded optical fiber 64a is retained in the ferrule by a suitable epoxy 66a. As in FIG. 3, a fiber jacket 68a protects the fiber portion which extends from the coupler.

The interior of the inside end portion of ferrule 62a is hollowed out, and low-melting-point metal 70a fills the space between the inside end portion of fiber 64a and the ferrule. The metal 70a is polished along plane surface 72a so as to provide a surface for reflecting output optical beams, and the area of metal 70a along surface 72a is at least as extensive as the expanded output optical beam from waveguide 58a. Therefore, in this embodiment the low-melting-point metal performs two functions, holding the inside end portion of fiber 64a in place and also providing the entire reflecting surface against which an output beam will impinge. Use of the low-melting-point metal in this way greatly facilitates construction of the coupler, and low-melting-point metal is particularly well suited for providing an optically reflective surface.

The waveguide 58a of coupler 52a comprises a ferrule 74a and a cladded optical fiber 76a; and the ferrule 74a is rigidly fastened to housing 54a, for example, by a suitable adhesive. Another ferrule 102 encompassing and rigidly fixed to a cladded network optical fiber 104 is rigidly connected to a threaded connector 106, and the housing 54a is threaded to receive the connector 106 as shown. This arrangement makes it possible to connect coupler 52a to and disconnect coupler 52a from the system's network conductors as desired.

Figure 5:
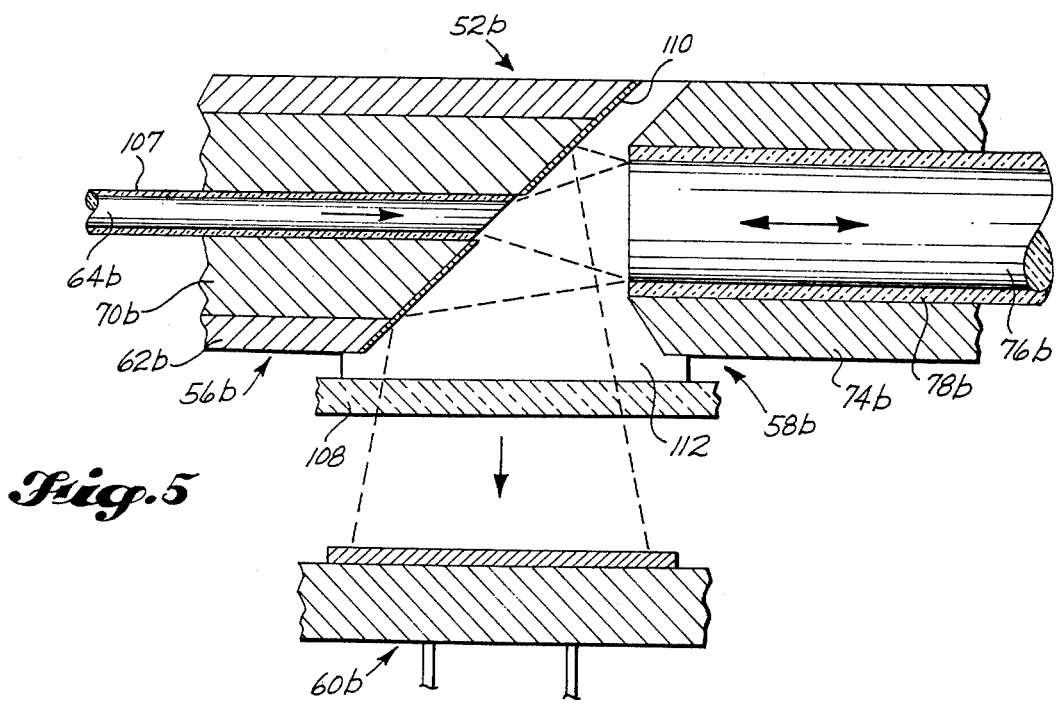
FIG. 5 is a sectional view of yet another modified form of the directional coupler of the present invention.

In FIG. 5 a directional coupler 52b is shown as comprising a first waveguide 56b, a second waveguide 58b, and a quartz window 108. The waveguide 56b includes an optical fiber core 64b, a coating 107 of cladding material, a ferrule 62b, and low-melting-point metal 70b filling the space between the cladding material and the ferrule. The waveguide 58b includes an optical fiber 76b having a cross-sectional area larger than that of fiber 64b, a cladding material 78b surrounding the fiber, and a ferrule 74b.

It will be seen by reference to FIG. 5 that in this embodiment the fiber core, the coating 107, the low-melting-point metal, and the ferrule are all cut so as to provide co-planar end surfaces which define a plane at approximately 45 degrees to the axis of the fiber. This plane, except for the cladded fiber portion, is plated with a second metal 110 such as gold which has superior reflecting properties; and the space between the plated surface, the waveguide 58b, and the window 108 is filled with a suitable optically conductive medium 112 such as an index-matching epoxy. Thus, in this embodiment the only function of the low-melting-point metal is to hold the fiber in the ferrule, and epoxy for this purpose is not required. Input optical beams and output optical beams are transmitted through coupler 52b as indicated by the broken lines in the same manner as in the embodiments previously described, and all of the reflected portion of an output beam impinges against the reflecting surface of the metal plating 110. As shown, the reflected portion of an output beam is received by the detector 60b.

The present invention also includes the method of coupling signals carried by optical beams in a communications system in accordance with the foregoing description. The method generally includes the steps of providing a first non-collimated optical beam from a first waveguide and transmitting the first beam through a passageway in a beam-directing surface to a second waveguide, providing a second non-collimated optical beam from the second waveguide, transmitting the second beam through a conductive medium to the beam-directing surface such that the area of the second beam received by the beam-directing surface is substantially larger than the passageway, reflecting that portion of the second beam not entering the passageway, and providing the reflected portion of the second beam to a detector. As already indicated, the large area of the second beam at the beam-directing surface relative to the area of the passageway is best accomplished by providing that the core area of the second waveguide is larger than both the area of the passageway and the core area of the first waveguide or by providing means for expanding the second beam as it travels from the second waveguide to the beam-directing surface.

Means for expanding the output optical beam as it travels from the network waveguide (e.g., waveguide 58) to the beam-directing means may comprise any suitable optically conductive medium such as an index-matching epoxy where non-collimated beams are being coupled. The degree of expansion or dispersion will depend on a number of factors including the spacing between the network waveguide and the beam-directing surface, the nature of the conductive medium, and the multi-mode nature of the optical beam. Generally, the larger the area of the beam impinging against the reflecting surface relative to the area of the passageway through the surface the greater will be the efficiency of the coupler. However, the area of the beam must not exceed, in extent, the area of the reflecting surface or the area of the photo sensor portion of the detector.

In most cases, fiber optic communications systems using waveguides to transmit non-collimated optical beams utilize light emitting diodes, infrared emitting diodes, or semiconductors injection laser diodes as sources; and these sources provide a beam having a cross-sectional area in a range between $3 \times 10^{-6}$ and $1 \times 10^{-2}$ square millimeters. The detectors utilized in such communications systems are generally either PIN photo diodes, avalanche photo diodes, or photo multipliers; and these detectors have an effective sensing area in a range between 1 and 300 square millimeters. Single fibers suitable for use in such systems generally have a core area in a range between $4 \times 10^{-4}$ and $4 \times 10^{-2}$ square millimeters. It will be apparent, therefore, that a detector suitable for use in these systems will have a sensing area substantially larger than the beam area of an optical beam provided by a source, and that the area of a fiber suitable for use in the system's network conductor will have a core area generally in a range between the two. The present invention is consequently very well suited for taking advantage of the most frequently used and readily available optical system components.

It will be readily appreciated by those skilled in the art that, with a coupler in accordance with the invention, fiber bundles could be utilized for the system's network conductor rather than a single optical fiber, and that the network waveguide need not necessarily be limited to the type disclosed herein. Furthermore, any suitable reflecting surface could be employed in the beam-directing means, and the geometrical relationships of the waveguide and the detector could be modified somewhat in a coupler in accordance with the invention.

Thus the foregoing description of my invention discloses preferred embodiments thereof, and various changes in form or detail may be made within the scope of the invention which is defined and limited only by the following claims.

What is claimed is:

1. A coupler for an optic data system, said coupler comprising:
    a source port,
    no more than one network port,
    a detector port,
    directing means in a path between said source port and said network port for receiving an output optical beam from said network port;
    said directing means including a passageway for passing an input optical beam from said source port to said network port,
    said directing means directing said output optical beam, except for a portion of said beam entering said passageway, to said detector port; and
    expanding means effective in a path between said network port and said directing means for expanding said output beam,
    wherein the cross-sectional area of said output beam at said network port is larger than the cross-sectional area of said input beam at said source port.

2. A coupler for an optic data system, said coupler comprising:
    a first optical waveguide adapted for connection to a source and having a first core area,
    a second optical waveguide adapted for connection to an optical transmission network and having a second core area larger than said first core area,
    a detector port, and
    directing means in a path between said first and second optical waveguides for receiving an output optical beam from said second optical waveguide,
    said directing means having a face including both a passage-way portion for passing an input optical beam from said first optical waveguide to said second optical waveguide and a deflecting portion,
    said deflecting portion directing said output optical beam to said detector port with an efficiency substantially equal to the ratio of the area of said deflecting portion to the total area of said face.

3. A coupler as in claim 2 including expanding means effective in a path between said second optical waveguide and said face of said directing means for expanding said output signal beam.

4. A coupler for an optic data system as claimed in claim 2 wherein said directing means comprises a single planar reflecting surface.

5. A directional coupler for a time division multiplex optic data system, said directional coupler comprising:

a first optical waveguide adapted for connection to a source, a second optical waveguide adapted for connection to an optical transmission network, a detector port, and beam coupling means between said first and second optical waveguides for receiving a first optical beam from said first waveguide and coupling said first beam to said second waveguide and for receiving a second optical beam from said second waveguide and coupling said second beam to said detector port, said coupling means including a beam-directing surface for receiving said second beam and directing said second beam to said detector port, said beam-directing surface defining an optical passageway for said first beam through said surface, said coupling means further including an optical transmission medium effective between said second waveguide and said beam-directing surface to expand said second beam, wherein said first optical waveguide has a first core area and said second optical waveguide has a second core area larger than said first core area.

6. A directional coupler for a time division multiplex optic data system, said directional coupler comprising:

a first optical waveguide adapted for connection to a source, a second optical waveguide adapted for connection to an optical transmission network, a detector port, and beam coupling means between said first and second optical waveguides for receiving a first optical beam from said first waveguide and coupling said first beam to said second waveguide and for receiving a second optical beam from said second waveguide and coupling said second beam to said detector port, said coupling means including a beam-directing surface for receiving said second beam and directing said second beam to said detector port, said beam-directing surface defining an optical passageway for said first beam through said surface, said coupling means further including an optical transmission medium effective between said second waveguide and said beam-directing surface to expand said second beam, wherein said first waveguide includes an end portion aligned with said optical passageway and said end portion extends into said passageway, and wherein said end portion of said first optical waveguide defines a surface co-planar with said beam-directing surface.

7. A directional coupler as in claim 6 wherein said surface of said first optical waveguide and said beam-directing surface provide a reflecting surface.

8. A directional coupler for a time division multiplex optic data system, said directional coupler comprising:

a first optical waveguide adapted for connection to a source, a second optical waveguide adapted for connection to an optical transmission network, a detector port, and beam coupling means between said first and second optical waveguides for receiving a first optical beam from said first waveguide and coupling said first beam to said second waveguide and for receiving a second optical beam from said second waveguide and coupling said second beam to said detector port, said coupling means including a beam-directing surface for receiving said second beam and directing said second beam to said detector port, said beam-directing surface defining an optical passageway for said first beam through said surface, said coupling means further including an optical transmission medium effective between said second waveguide and said beam-directing surface to expand said second beam, wherein said second waveguide has a first core area and said detector port has a second core area larger than said first core area.

9. A directional coupler for a time division multiplex optic data system, said directional coupler comprising:

a first optical waveguide adapted for connection to a source, a second optical waveguide adapted for connection to an optical transmission network, a detector port, and beam coupling means between said first and second optical waveguides for receiving a first optical beam from said first waveguide and coupling said first beam to said second waveguide and for receiving a second optical beam from said second waveguide and coupling said second beam to said detector port, said coupling means including a beam-directing surface for receiving said second beam and directing said second beam to said detector port, said beam-directing surface defining an optical passageway for said first beam through said surface, said coupling means further including an optical transmission medium effective between said second waveguide and said beam-directing surface to expand said second beam, said directional coupler including a ferrule encompassing said first waveguide and further including a low-melting-point metal between said first waveguide and said ferrule for locating and retaining said first waveguide relative to said ferrule.

10. A directional coupler as in claim 9 wherein said first waveguide includes an end portion defining a first surface and said low-melting-point metal defines a second surface co-planar with said first surface, said second surface providing said beam-directing surface.

11. A directional coupler as in claim 9 wherein said low-melting-point metal defines a first surface and said ferrule includes an end portion defining a second surface co-planar and contiguous with said first surface, said beam-directing surface comprising a reflective metal plating on said first and second surfaces.

12. In a fiber optic data system including a transmission network and a data terminal having a source and a detector, a directional coupler for coupling a first non-collimated optical beam from said source to said transmission network and for coupling a second non-collimated beam from said transmission network to said detector; said directional coupler comprising:

a detector port optically coupled to said detector, a first optical waveguide connected to said source and having a first core area, a second optical waveguide connected to said transmission network and having a second core area larger than said first core area, and directing means in a path between said first and second optical waveguides for receiving an output optical beam from said second optical waveguide, said directing means including a deflecting portion defining a passageway for passing an input optical beam from said first optical waveguide to said second optical waveguide, said directing means directing all of said output optical beam impinging against said deflecting portion to said detector port, said fiber optic data system including expanding means effective in a path between said second optical waveguide and said directing means for expanding said output optical beam.

13. A fiber optic data system as claimed in claim 12 wherein said expanding means comprises an index-matching epoxy, said index-matching epoxy securing said detector port, said first optical waveguide, said second optical waveguide, and said directing means together to form a rigid integral coupler.

14. In a fiber optic data system as claimed in claim 12 wherein said deflecting portion defines a single planar surface.

15. A method for coupling optical beams in an optic data system including a detector, a first optical waveguide, a second optical waveguide, and an apertured beam-directing surface between said first and second waveguides; said method comprising the steps of:

providing a first non-collimated optical beam having a first cross-sectional area at said first waveguide, transmitting said first beam from said first waveguide through the aperture in said beam-directing surface to said second waveguide, providing a second non-collimated optical beam having a second cross-sectional area larger than said first cross-sectional area at said second waveguide, transmitting said second beam from said second waveguide to said apertured beam-directing surface, expanding the cross-sectional area of said second beam between said second waveguide and said beam-directing surface, directing that portion of said second beam impinging upon said surface away from said aperture, and transmitting said portion of said second beam from said surface to said detector.

16. An optical directional coupler comprising: a first waveguide adapted for connection to a source, a second waveguide adapted for connection to a transmission network, a detector port, a beam-directing surface positioned between said first and second waveguides and defining an optical passageway through said surface aligned with and adjacent said first waveguide, and a beam-conducting medium between said beam-directing surface and said second waveguide for transmitting an input optical beam from said passageway to said second waveguide and for transmitting an output optical beam from said second waveguide to said beam-directing surface, said second waveguide having a core area larger than the area of said passageway and said beam-conducting medium effective to expand said output optical beam, said beam-directing surface directing that portion of the output optical beam incident thereagainst towards said detector port.

17. An optical directional coupler as claimed in claim 16 wherein said beam-conducting medium comprises an index-matching epoxy securing said first waveguide, said second waveguide, said detector port, and said beam-directing surface together to form a rigid integral coupler.

18. An optical directional coupler comprising: a first waveguide adapted for connection to a source, a second waveguide having a core area and adapted for connection to a transmission network, a detector port, a beam-directing surface positioned between said first and second waveguides and defining an optical passageway aligned with and adjacent said first waveguide, and a beam-conducting medium between said beam-directing surface and said second waveguide for transmitting an input optical beam from said passageway to said second waveguide and for transmitting an output optical beam from said second waveguide to said beam-directing surface, said passageway having a first area smaller than said core area and said output optical beam incident against a second area of said beam-directing surface which is larger than said core area, said beam-conducting medium comprising an index-matching epoxy.

19. An optical directional coupler as claimed in claim 16 or claim 18 wherein said beam-directing surface comprises a single planar reflecting surface.

* * * * *